（12) United States Patent
Shennib

(10) Patent No.: US 12,498,584 B2
(45) Date of Patent: Dec. 16, 2025

(54) EYEGLASS HEARING DEVICE WITH BIOSENSORS

(71) Applicant: Adnan Shennib, Oakland, CA (US)

(72) Inventor: Adnan Shennib, Oakland, CA (US)

(*) Notice: Subject to any disclaimer, the term of this patent is extended or adjusted under 35 U.S.C. 154(b) by 0 days.

(21) Appl. No.: 18/667,862

(22) Filed: May 17, 2024

(65) Prior Publication Data

US 2024/0393603 A1  Nov. 28, 2024

Related U.S. Application Data

(60) Provisional application No. 63/468,302, filed on May 23, 2023.

(51) Int. Cl.
 *G02B 27/01* (2006.01)
 *G02B 27/00* (2006.01)
 *H04M 1/02* (2006.01)

(52) U.S. Cl.
 CPC ..... *G02B 27/0176* (2013.01); *G02B 27/0093* (2013.01); *H04M 1/0258* (2013.01);
 (Continued)

(58) Field of Classification Search
 CPC ......... G02C 11/06; G06F 1/163; G06F 3/011; G06F 3/013; G06F 3/015; H04R 1/1041; H04R 25/407; H04R 25/43; H04R 1/1083; H04R 2225/39; H04R 2225/55; H04R 2225/61; H04R 2430/20; H04R 2460/07; H04R 25/552; H04R 25/554;
 (Continued)

(56) References Cited

U.S. PATENT DOCUMENTS 4,902,120 A  2/1990 Weyer
5,892,564 A  4/1999 Rahn
 (Continued)

FOREIGN PATENT DOCUMENTS

EP   3761660 A1   1/2021
JP   2015148402 A   5/2019

OTHER PUBLICATIONS

Kuk; Slugocki;Korhonen;Peeters, Forms Influence Functions: Microphone Angle and Speech-in-Noise Performance, The Hearing Review, Mar. 13, 2024, 2024;31(3): 14-19.
 (Continued)

*Primary Examiner* — Nelson M Rosario
(74) *Attorney, Agent, or Firm* — PATENT PORTFOLIO BUILDERS PLLC

(57) ABSTRACT

The present disclosure describes eyeglass hearing devices, systems and methods of enhancing the hearing ability, while providing reliable biosensing of vital signs with sensors located along the path of superficial temporal artery. A temple portion extending downward in front of the ear then medially into the ear cavity secures the eyeglass device to the head and provides highly efficient sound delivery. An array of microphones enables high directionality for enhancing speech recognition in noisy environments. The eyeglass hearing device may be communicatively coupled to a smartphone for telephony, audio streaming, and for selecting the directionality for sound pickup. Applications include hearing enhancement, music listening, telephony, voice detection, voice authentication, speaker isolation, audio recording, language translation, and acoustic scene detection.

22 Claims, 11 Drawing Sheets

(52) U.S. Cl.
CPC .. *G02B 2027/0178* (2013.01); *H04R 2499/11* (2013.01); *H04R 2499/15* (2013.01)

(58) Field of Classification Search
CPC ........ H04R 25/606; H04R 5/027; H04R 5/04; H04R 1/1016; H04R 2420/07; H04R 2460/13; H04R 2499/11; H04R 2499/15; A61N 1/36038; G02B 27/0093; G02B 27/0176; G02B 2027/0178; H04M 1/0258
See application file for complete search history.

(56) References Cited

U.S. PATENT DOCUMENTS

| | | | |
|---|---|---|---|
| 5,988,812 A | 11/1999 | Wingate | |
| 6,409,338 B1 | 6/2002 | Jewell | |
| 7,461,936 B2 | 12/2008 | Jannard | |
| 8,626,249 B2* | 1/2014 | Ungari | H02J 7/00 342/51 |
| 9,264,824 B2 | 2/2016 | Pruthi et al. | |
| 9,769,577 B2 | 9/2017 | Shennib | |
| 10,799,122 B2 | 10/2020 | Tzvieli et al. | |
| D954,137 S | 6/2022 | Cohen et al. | |
| 11,526,034 B1* | 12/2022 | Pattikonda | G02C 11/10 |
| 11,604,367 B2 | 3/2023 | Tzvieli et al. | |
| 11,852,900 B2 | 12/2023 | Borsoi et al. | |
| D1,016,895 S | 3/2024 | Drake et al. | |
| D1,017,671 S | 3/2024 | Drake et al. | |
| 11,953,695 B2 | 4/2024 | Hong et al. | |
| 2016/0100676 A1* | 4/2016 | Sandanger | A45F 5/00 224/181 |
| 2018/0042496 A1* | 2/2018 | Lachhman | A61B 5/742 |
| 2019/0174237 A1* | 6/2019 | Lunner | H04R 1/1041 |
| 2023/0117720 A1 | 4/2023 | Heger et al. | |
| 2023/0210442 A1* | 7/2023 | Krueger | A61B 5/6803 600/301 |

OTHER PUBLICATIONS

Bray & Nilsson, Additive SNR Benefits of Signal Processing Features in a Directional DSP Aid, The Hearing Review, Dec. 5, 2001, 8(12), pp. 48-51.

* cited by examiner

EYEGLASS HEARING DEVICE WITH BIOSENSORS

CROSS-REFERENCE TO RELATED APPLICATIONS

This application claims the benefit under 35 U.S.C. § 119 of the earlier filing date of U.S. Provisional Application No. 63/468,302 entitled "EYEGLASS HEARING DEVICE WITH BIOSENSORS PROXIMAL TO SUPERFICIAL TEMPORAL ARTERY," filed May 23, 2023.

This application is also related to concurrently filed utility non-provisional patent application titled "FRONT OF THE EAR HEARING DEVICE WITH BIOSENSORS", filed May 17, 2024.

The aforementioned applications are incorporated herein by reference in their entirety, for any purpose.

TECHNICAL FIELD

The present disclosure relates to hearing devices. In some embodiments, provided herein are listening devices incorporated in an eyeglasses form-factor. For the purpose of this application, a hearing device refers to any device for listening purposes including a hearing aid, an earphone device, earbud, hearables, etc. for delivering sound or audible vibrations in or around the ear.

BACKGROUND

Wearables are increasingly incorporating biosensors for sensing vital signs and physical activity including temperature, heart rate, oxygen saturation level, motion, etc. Incorporating hearing enhancement within an eyeglass assembly is well known in the art. In prior art eyeglass hearing device configurations 10 shown in FIGS. 1 & 2, the temple portion 11 of the eyeglass extends over and around the ear 20 via a posterior extension 14 to secure the eyeglass to the head 25. Eyeglasses hearing devices (also known as spectacle hearing aids) typically provide a speaker portion 12 (also referred to as receiver) for delivering sound 33 behind the tragus 21 directly into the ear cavity 22 (FIG. 1). In some embodiments, a sound tube 13 is provided to deliver sound from a speaker provided in the frame portion to the ear canal. In other prior art embodiments shown in FIG. 3, a speaker 31 is placed within the temple portion 11 for transmitting air-conducted sound 32 indirectly to the ear cavity 22. In another embodiments, a vibrating element (not shown) is placed within the temple portion 11 for delivering audible vibrations through the skull of the head 25. FIG. 3 represents an open-ear eyeglass hearing device 30 since there is no occlusion for the ear cavity 22, allowing ambient sounds from the environment to enter the ear canal. However, direct sound delivery into the ear is advantageous in some cases for energy efficiency and for suppression of ambient noise from the environment. It is well known in the art that direct delivery of sound into the ear cavity 22 consumes a fraction of the energy compared to sound delivery from a speaker, or a vibrator, placed outside the ear cavity 22.

The application of biosensors within a wearable device, including a hearing device, is also known in the art. One or more sensors are generally incorporated and positioned for sensing vital signs or physical activity. Biosensing may provide information regarding health and safety for individuals wearing a wearable device, or for an individual caring for a person wearing the wearable device. However, the prior art wearable hearing devices have limitations in providing reliable sensing of biological signals.

Placement of a hearing device receiver 12 in the ear cavity 22 may be desirable for various advantages including reduced feedback, lower power consumption, longer battery operation, reduced distortion, reduced receiver vibrations, discrete communications, and improved high frequency response. To achieve these desirable effects, a speaker of a wearable hearing device is preferably inserted at least partially in the ear cavity 22 for closer proximity to the eardrum.

Anatomy of the Temple and Condyle Areas of the Head

The temple 26 is generally anterior (front) superior (up) with respect to the external ear 20, and superior (up) to the mandibular condyle area 27 as shown in FIG. 4. The temple 26 and condyle area 27 are highly vascular underneath the skin, mainly due to the presence of the superficial temporal artery 28 and its branches 29, as well as the superficial temporal vein (not shown) adjacent to the temporal artery 28. Vital signs such as heart rate, blood pressure, oxygen saturation level, temperature, etc. can be obtained non-invasively by placing biosensors at the temple 26 or condyle 27 areas, along the path of superficial temporal artery 28.

Prior art hearing aid eyeglass 10 (FIGS. 1-3) rely on the placement of temple posterior portion 14 over the ear 20 for securing the eyeglass device to the head. For delivering sounds efficiently into the ear, a speaker 12 or a sound tube 13 is employed. This means two separate mechanical structures are required; one over the ear to secure the eyeglass device, and one to deliver sound to the ear cavity 22. For consumers this may be cumbersome and unsightly. The present disclosure describes examples of new eyeglass hearing devices which address the aforementioned shortcomings.

SUMMARY

An eyeglass hearing device comprising a speaker portion comprising a speaker that is medially oriented for delivering sound into the ear of a user, a temple portion extending downward anterior to the ear of the user wherein the temple portion is connected to the speaker portion. The device further comprises at least one microphone positioned on the temple portion and an audio processor for processing signals sensed by the microphone. The eyeglass hearing device further comprising wireless electronics for communicating with a wireless device in proximity to the eyeglass hearing device. In one embodiment, the device is configurable for hearing enhancement. In some embodiments, the eyeglass hearing device further comprises a plurality of biosensors placed in proximity to the superficial temporal artery of the user for detecting one or more vital signs of the user. The biosensors may comprise of optical sensors. Biosensors may be positioned along the path of superficial temporal artery for non-invasively detecting vital signs such as heart rate, oxygen saturation level, glucose level, blood pressure, respiration rate and temperature. In some embodiments, the device comprises a motion sensor for detecting any of motion, position and physical activity of the user, a vibration sensor. In one embodiment, the device is configured for detecting self-voice of the user, enabling wireless communication with a smartphone communicatively coupled thereto, receiving wireless audio streaming, enabling telephony communications, or receiving voice commands. In some embodiments, the device further comprises any one or more of an audio processor, an artificial intelligence (AI) processor and a biosensing hub. In some embodiments, the device further comprises a lens configured for any of UV protection, reading, electro-chromatic, vision correction and display. In some embodiments, the device further comprises one or more control switches, including manual and contactless switches.

In another embodiment, a communication system is provided, the system comprising an eyeglass hearing device and a telephony device, wherein the telephony device is communicatively coupled to the eyeglass hearing device.

BRIEF DESCRIPTION OF THE DRAWINGS

The above and still further objectives, features, aspects and attendant advantages of the present invention will become apparent from the following detailed description of certain preferred and alternate embodiments and method of manufacture and use thereof constituting the best mode presently contemplated of practicing the invention, when taken in conjunction with the accompanying drawings, in which.

DETAILED DESCRIPTION

Before the present invention is described, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

All publications mentioned herein are incorporated herein by reference to disclose and describe the methods and/or materials in connection with which the publications are cited. It is understood that the present disclosure supersedes any disclosure of an incorporated publication to the extent there is a contradiction.

It must be noted that as used herein and in the appended claims, the singular forms "a", "an", and "the" include plural referents unless the context clearly dictates otherwise.

Certain details are set forth below to provide a sufficient understanding of embodiments of the invention. However, it will be appreciated by one skilled in the art that some embodiments may not include all details described. In some instances, well-known structures, hearing aid and eyeglass components, circuits, and controls, have not been shown in order to avoid unnecessarily obscuring the described embodiments of the invention.

Figure 1:
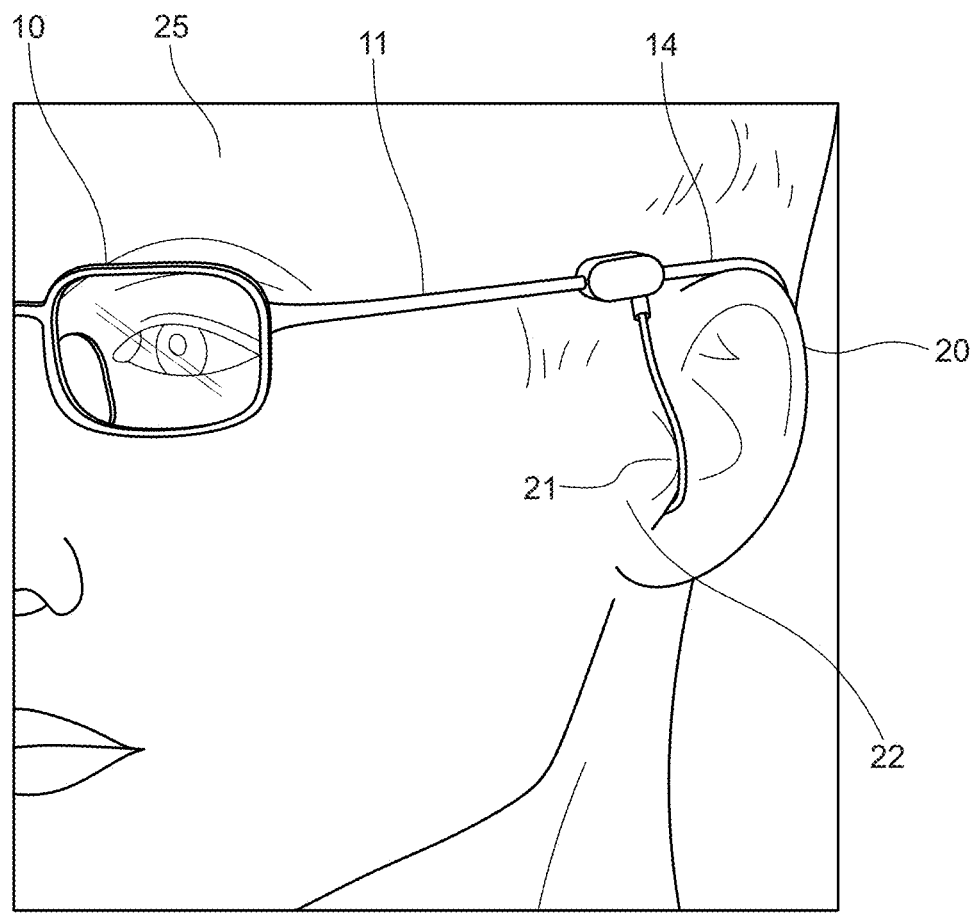
FIG. 1 is a view of prior art eyeglass hearing device showing the temple portion extending over the ear and a receiver extension to deliver sound into the ear.
Figure 2:
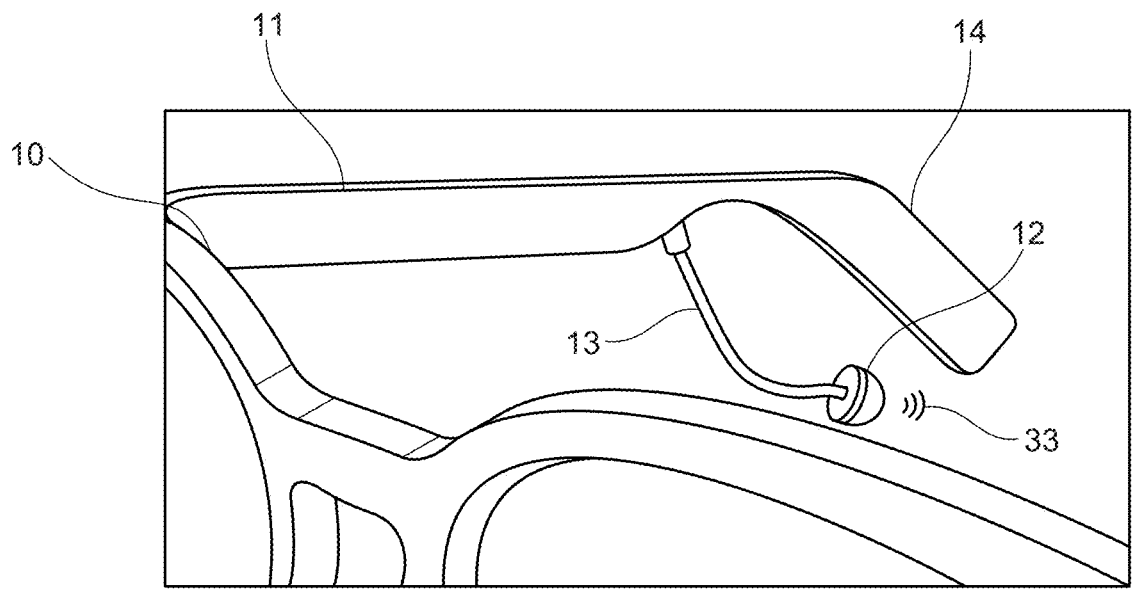
FIG. 2 is a more detailed view of prior art eyeglass hearing device of FIG. 1 showing the temple portion and posterior portion extending for placement over and around the ear and securing the device to the head.
Figure 3:
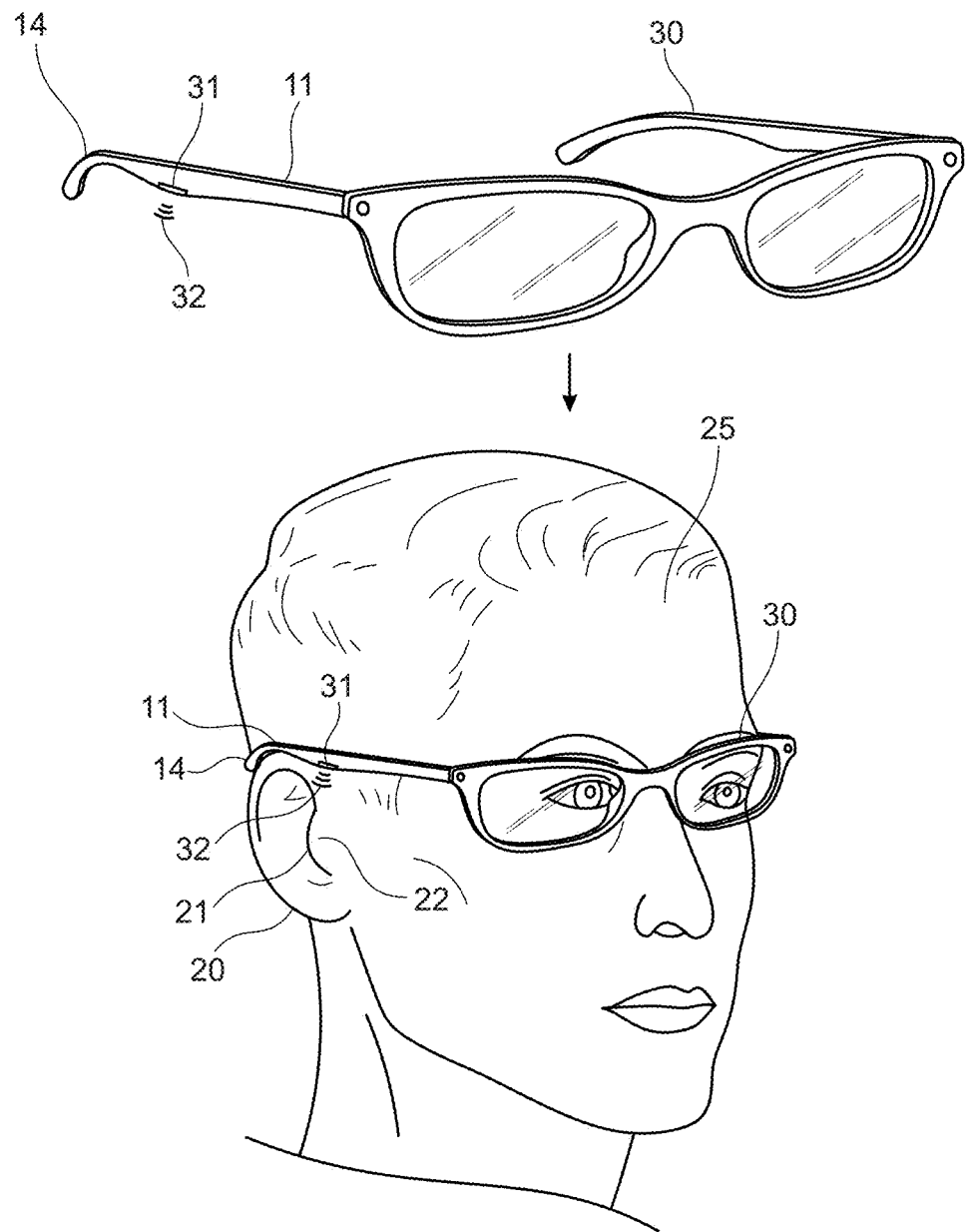
FIG. 3 is a view of a prior art open ear eyeglass hearing device with a receiver embedded within the temple portion and extension over the ear for securing the eyeglass device when worn.
Figure 4:
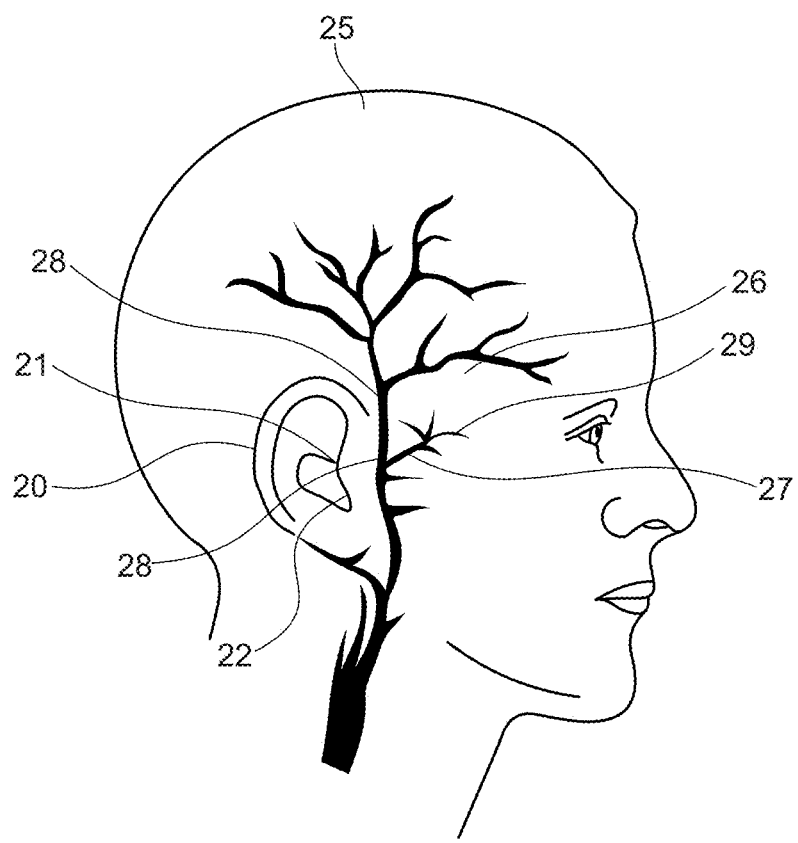
FIG. 4 is an anatomical view of the superficial temporal artery with respect to the ear, temple and mandibular condyle areas of the head.
Figure 5:
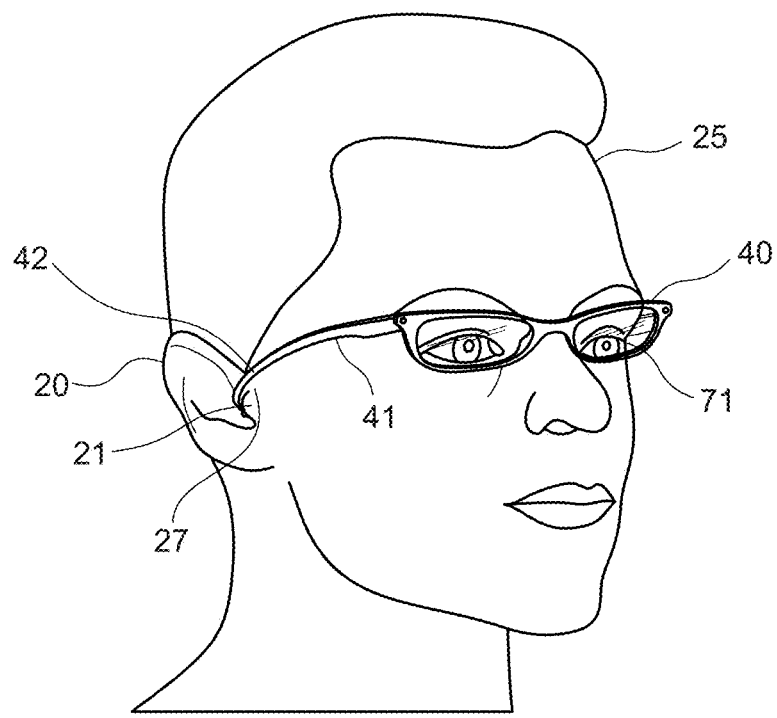
FIG. 5 is a view of an eyeglass hearing device showing a temple portion extending downward towards the tragus and delivering sound directly into the ear canal, according to some examples.
Figure 6:
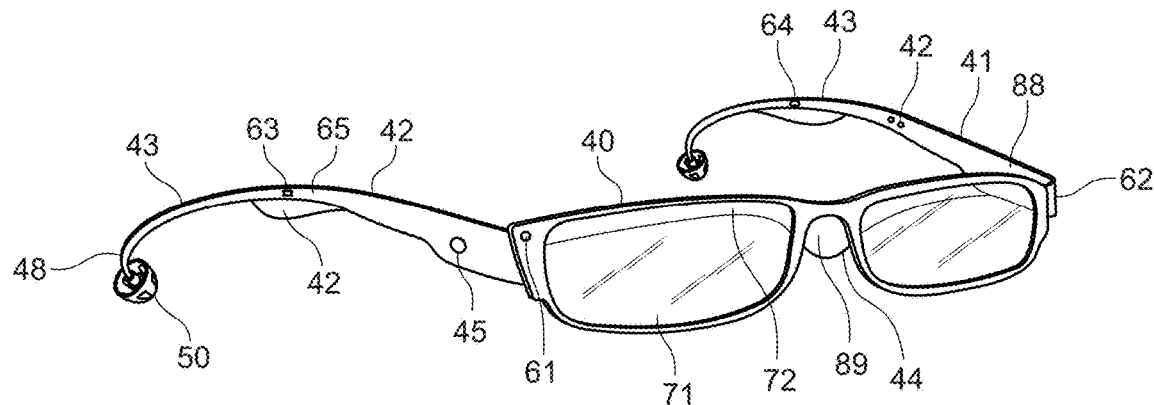
FIG. 6 is a more detailed view of the eyeglass hearing device showing multiple microphones and biosensors, according to some examples.
Figure 8:
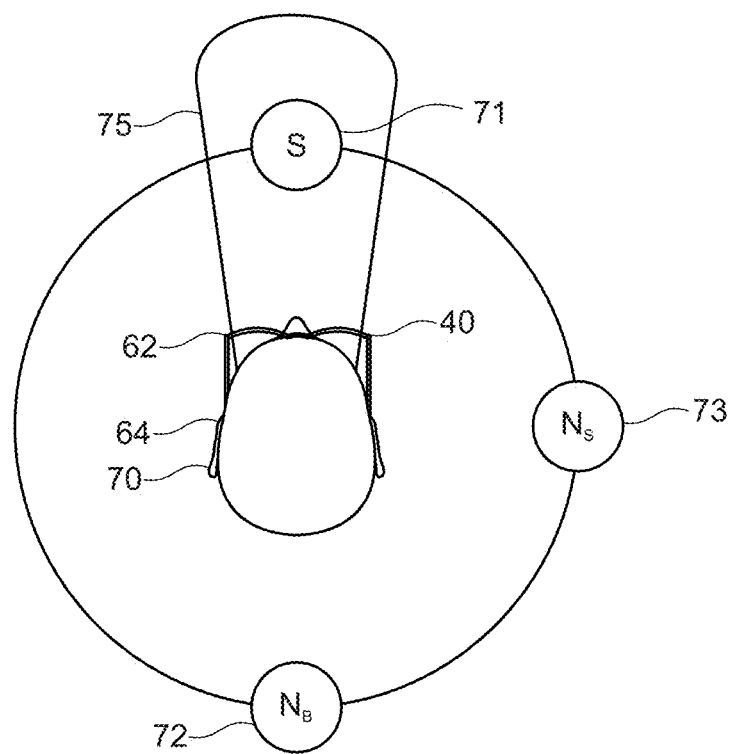
FIG. 8 is a diagram showing sound directionality, according to some examples.
Figure 9:
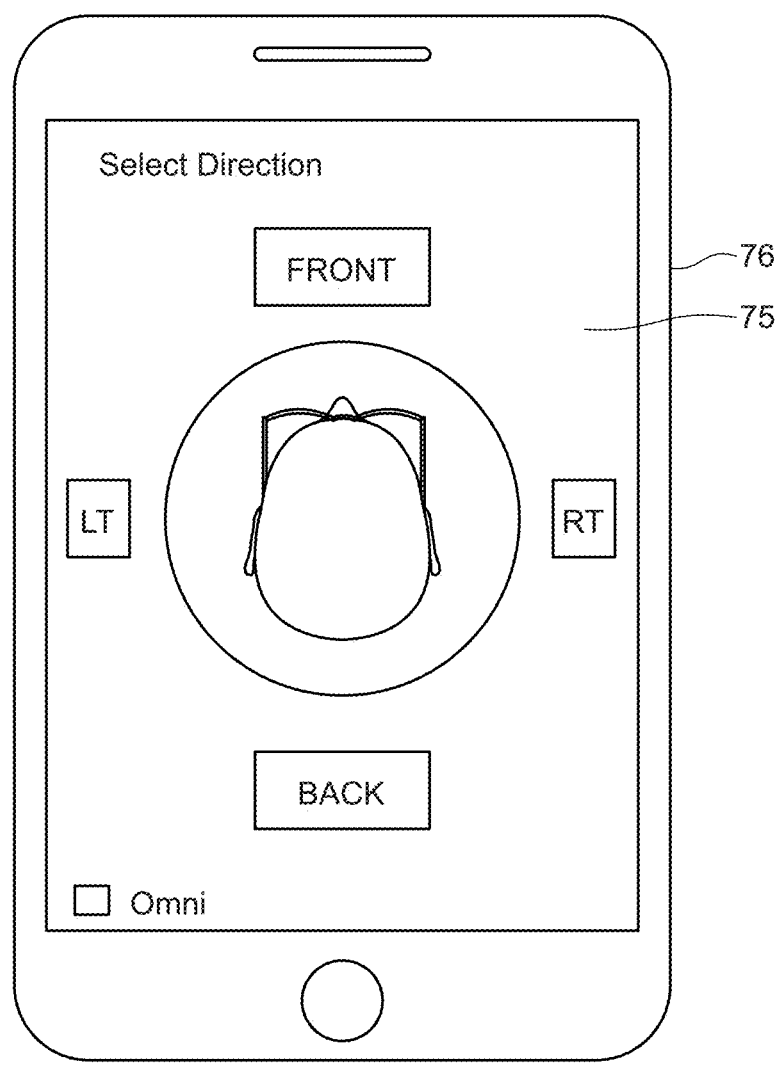
FIG. 9 is a view of an APP screen for a smartphone communicatively coupled to the eyeglass hearing device, allowing the user to select the directionality, according to some examples.
Figure 10:
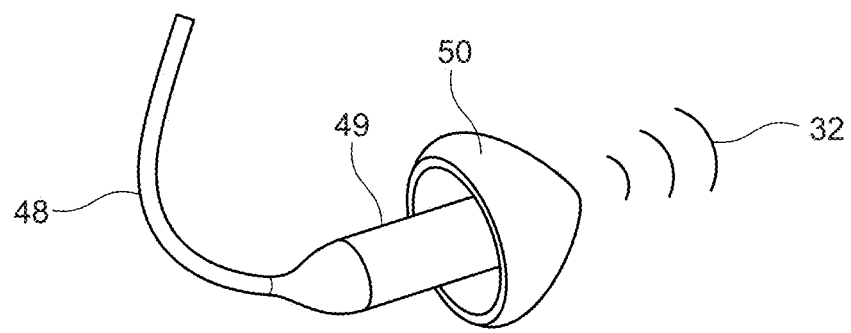
FIG. 10 is a view of the receiver assembly with closed-fit arrangement, according to some examples.
Figure 11:
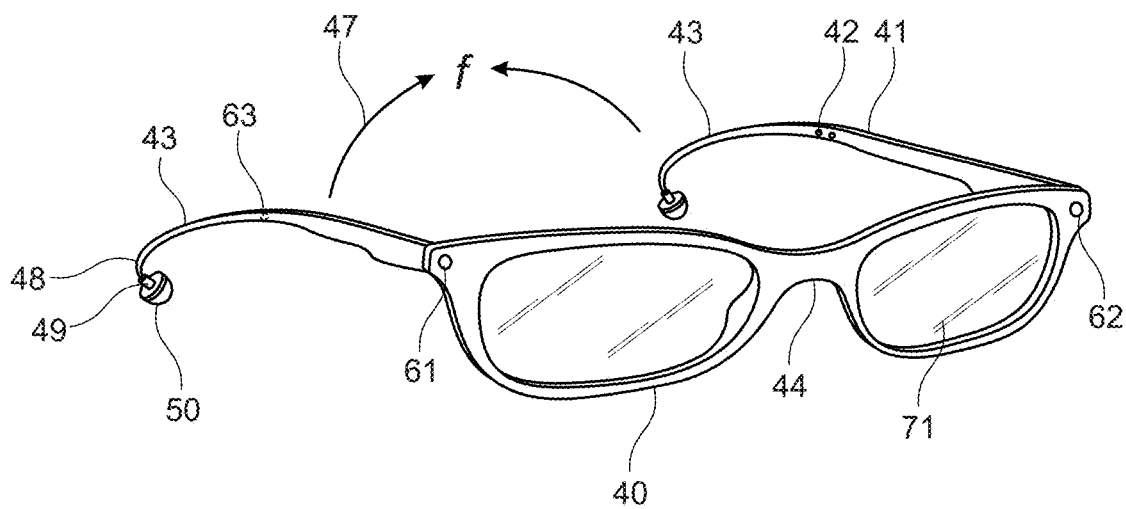
FIG. 11 is a view of the eyeglass hearing device configured for an inward radial force with respect to the human head for securing thereto, according to some examples.

The present disclosure describes examples of eyeglass hearing devices for enhancing the hearing ability, particularly in noisy conditions, while maintaining reliable biosensing of vital signs. In some embodiments, as shown in FIGS. 5-13, the eyeglass hearing device 40 comprises a temple portion 41, positioned generally at the temple 26, extending downward anterior (front) to the ear 20 over the condyle 27 and over the tragus 21 before curving medially (inward) towards the ear cavity 22. In an embodiment, the condyle portion 43 extends into the upper or lower notches of the tragus 21. One or more sensors 42 for non-invasively sensing vital signs are positioned in proximity to the superficial temporal artery 28 along the temple portion 41 or the condyle portion 43, along the path of superficial temporal artery 28. In an embodiment, the sensors 42 are configured to exert slight radial force 47 ("f" in FIG. 11) to provide slight pressure on the skin for continuous reliable sensing of vital signs. This is accomplished, for example, by providing a semi-rigid, or spring-loaded temple portion. In preferred embodiments, a receiver portion 48, extending from the condyle portion 43, comprises a speaker 49 (interchangeably also called as receiver 49) for placement into the ear cavity 22 to deliver sound 32 directly thereto. An ear tip 50 may be provided at the receiver 49 for securing the receiver portion 48 into the ear cavity 22, and generally for assisting and securing the eyeglass hearing device 40 to the head 25. The ear tip 50 may be an open-fit type as shown in FIG. 6 comprising openings (large vents) or closed-fit type providing acoustic sealing into the ear cavity 22, as shown in FIG. 10. The ear tip is preferably made of soft and compliant material such Silicone® or medical grade rubber and offered in assorted types and sizes to fit individual ears. Ear tip 50 may be configured for placement into the concha bowl (behind the tragus 21) or deeper into the ear canal. Placement of the speaker into the ear cavity provides efficient sound delivery while significantly reducing feedback occurrences when the eyeglass hearing device is providing significant level of sound amplifications. For example, a closed-fit seal tip may be more suitable when acoustic gains are higher than 30 decibels. In another example, an open-fit ear tip may be preferred for receiving natural sounds concurrently with amplified sounds 32 from the receiver 49. In other applications, ambient noise cancellation may be achieved by a closed-fit ear tip, or electronically by noise cancellation algorithm embedded in the electronics of the eyeglass hearing device 40. The eyeglass hearing device 40 further comprises a bridge portion 44.

Various electronic components, sensors, transducers, lenses, camera lens and power sources (battery) may be incorporated in the frame of the eyeglass hearing device 40, including but not limited to bridge portion 44, temple portion 41, condyle portion 43, and receiver portion 48, for implementing the form and function as disclosed in the example embodiments of the present disclosure.

In an embodiment, biosensors 42 are configured for placement generally at the temple 26 or the condyle 27 areas of the head 25, in proximity to superficial temporal artery 28 and the adjacent to superficial temporal vein for non-invasively sensing of vital signs.

Figure 12:
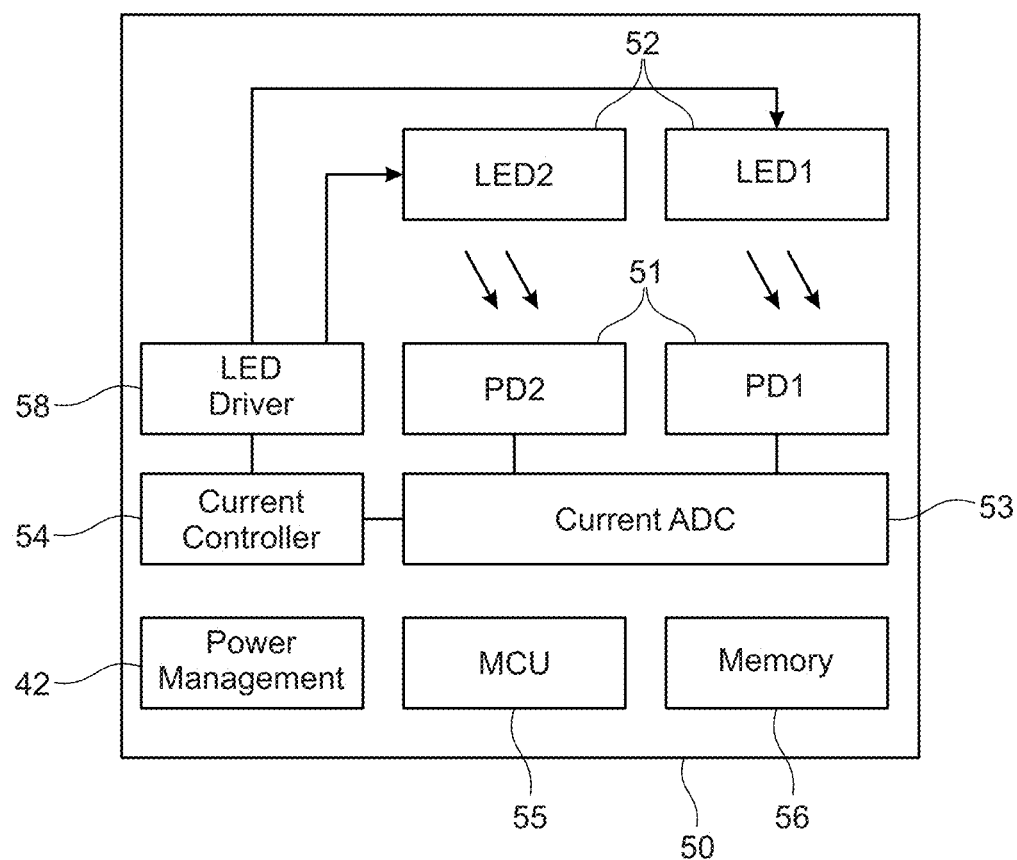
FIG. 12 is a simplified block diagram of a biosensor hub embedded in the eyeglass hearing device for placement near the superficial temporal artery area, according to some examples.
Figure 13:
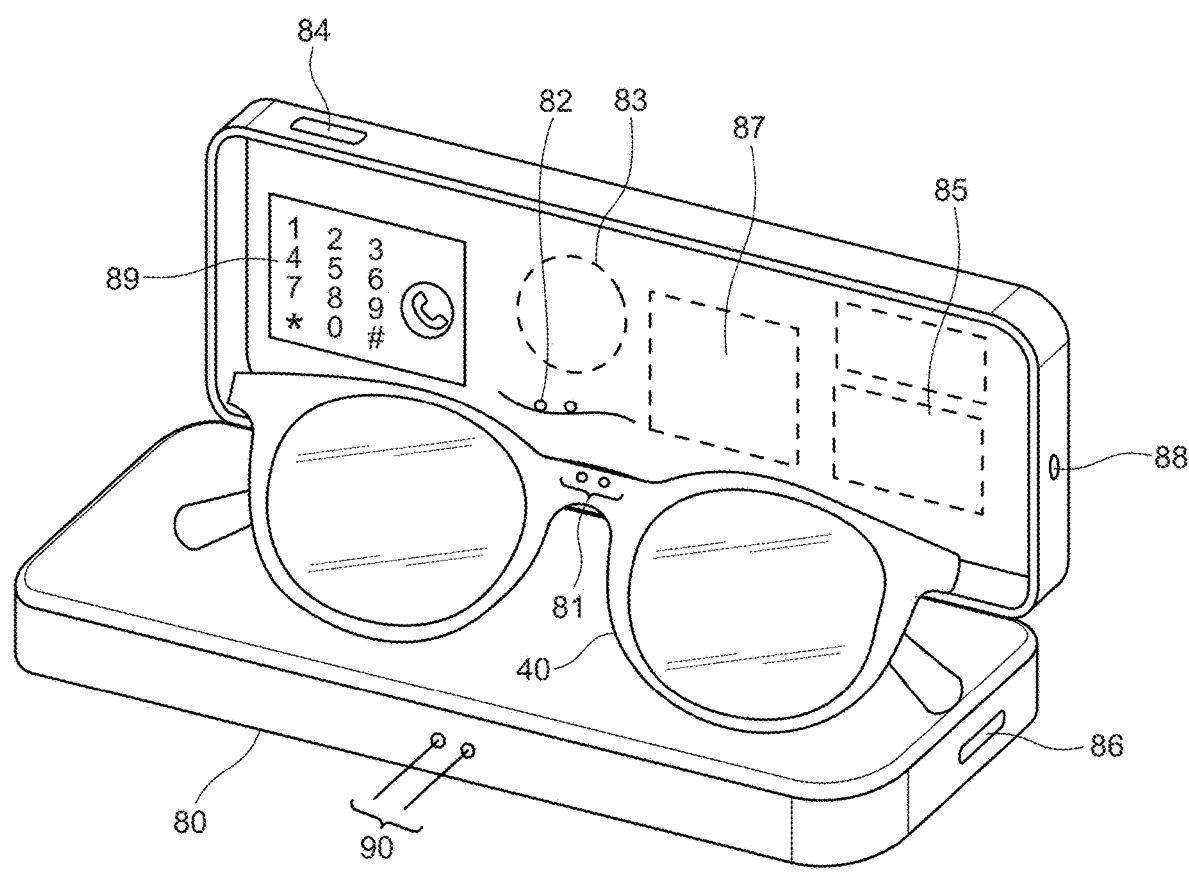
FIG. 13 is a view of a charging case configured as a telephony device, according to some examples.

FIG. 12 shows an example biosensor hub 50 incorporating optical sensors comprised of photodiodes 51 (PD1 & PD2) and light emitting diodes 52 (LED1 & LED2) for various vital sign measurements including photoplethysmogram (PPG) bio-signals from volumetric changes in the microvascular tissues near the superficial temporal artery. PPG measurements may be performed in conjunction with integrated circuitry and algorithms embedded in the biosensor hub 50, including LED driver 58, current analog to digital converter (CADC) 53, current controller 54, a microcontroller unit (MCU) 55 and memory 56 for storing operational code and algorithms dedicated to vital sign signal detection. In a preferred embodiment, heart rate (HR) and oxygen saturation (SpO2) are detected by the biosensors 42. An example of biosensor hub 50 is MAXM86146 manufactured by Analog Devices, Inc, comprising optical biosensing Analog Front End (AFE), an ARM® microcontroller and two photodiodes. In another embodiment, a motion sensor 57, such as 3-axis accelerometer IC KIONIX KX122 manufactured by ROHM Co., Ltd, may be incorporated to sense head position and motion for a person wearing the eyeglass hearing device 40.

Figure 7:
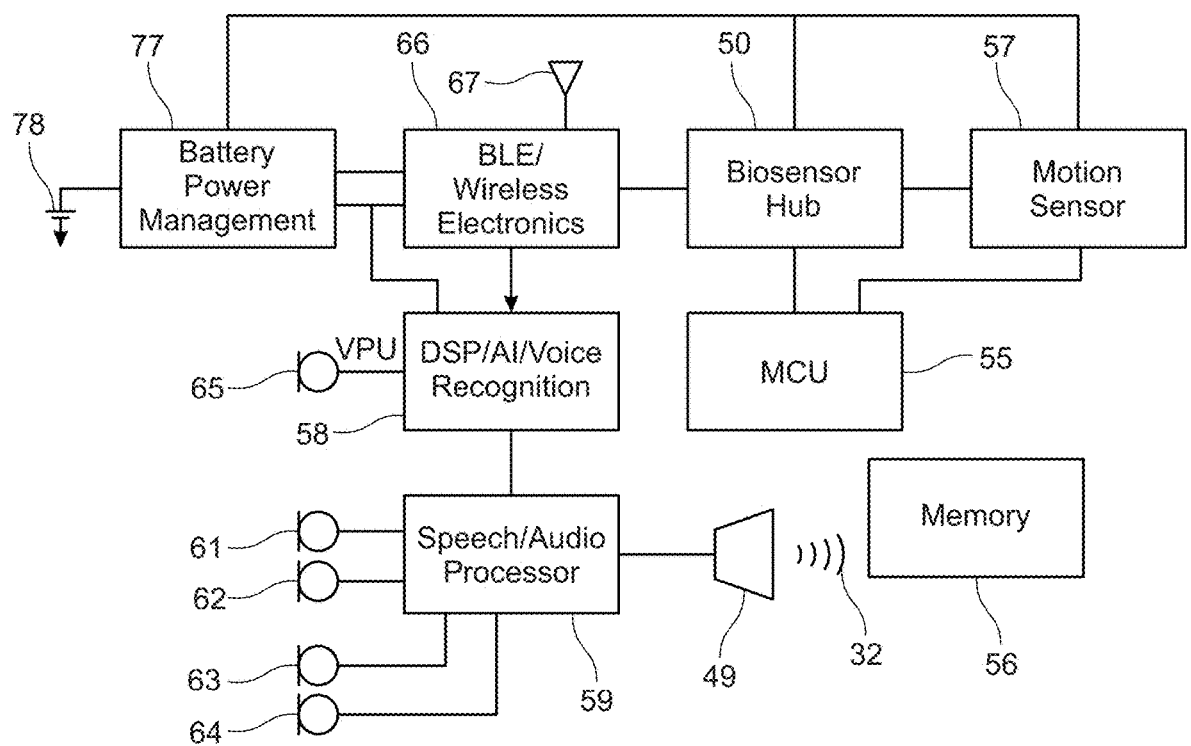
FIG. 7 is a high-level block diaphragm of major electronics and sensors embedded in the eyeglass hearing device, according to some examples.

In some embodiments, the eyeglass hearing device 40 comprises multiple processors, each dedicated for specialized functions as shown in FIG. 7. For example, MCU 55 for detecting vital sign signals and motion sensing, a digital signal processor (DSP) 58 for voice recognition and artificial intelligence functions, and an audio processor 59 for processing speech and audio signals picked up the array of microphones 61-64 provided within the eyeglass hearing device 40.

In another embodiment, multiple microphones are provided for achieving highly directional hearing ability. Directionality is particularly important for improving speech perception in certain situations. For example, wearers can turn their head in the direction of interest to enhance speech perception in noisy environments such as a restaurant. The directional enhancement is partially achieved by aligning two or more microphones along the temple portion 41 at sufficient distance between the microphones. Sounds from other directions are relatively suppressed by an algorithm executed by audio processor 59, which cancels sounds from other directions. Front microphones 61 and 62 are generally located on the front, and two rear microphones 63 and 64 are positioned generally at the rear of the temple portion 41. In one embodiment, voice pick up (VPU) microphone 65 is incorporated in the frame to pick up skull vibrations created by the person wearing the eyeglass hearing device 40 when talking. The VPU is sometimes referred to as vibration sensor. The four microphones 61-64, in conjunction with audio processor 59 and directionality algorithms, are employed to improve signal to noise (S/N) ratio as shown in FIG. 8. The subject of interest(S) 71 is generally at the front direction with respect to the head as shown relative to backside noise ($N_B$) 72 and side noise ($N_S$) 73. Various sensitivity and directionality patterns maybe achieved by microphone arrangements and algorithms, including hyper-cardioid, super-cardioid, and shotgun" pattern as shown in FIG. 8 which exhibits a sharp pick-up at the front relative to other directions. Although frontal directionality may be generally desirable, particularly for hearing-impaired persons with compromised speech recognition ability, alternate directionalities may be desired. In an example embodiment, an application (APP) 75 for a smart phone 76 communicatively coupled to the eyeglass hearing device 40 is provided to select a desired directionality for sound pickup. This includes omnidirectional, front, side, or back choices, as shown in FIG. 9. The sensitivity or pattern of directionality may also be selected by the eyeglass hearing device user 70 from an APP.

A voice pick-up (VPU) microphone 65, in conjunction with an algorithm, may be provided to enhance self-voice, or to cancel it, depending on the application. Self-voice enhancement may be applied for voice commands and voice authentication applications, while self-voice cancellation may be applied for hands-free phone calls and hearing aid applications, according to some examples. It should be understood that other microphone arrangements may be provided to achieve desired audibility and directionality. In preferred embodiments, signal to noise (S/N) ratio improvement is at least 6 dB, and preferably 12 dB or more for high noise and far sound applications. The superior directionality achieved by the eyeglass hearing device 40 as described herein is partially achieved by the relatively large distance between front and rear microphones placed along the temple portion 41, and by the horizonal arrangement along the line of sight, compared to conventional hearing aids (i.e., BTE and RIC hearing aids) whereby two microphones are arranged at relatively small distance and at substantial vertical orientation, limiting the S/N improvement to about 2-4 dB as known in the field of hearing aids. In the preferred embodiments, the distance between front microphone and rear microphone is 4-7 cm.

In a preferred embodiment, the eyeglass hearing device 40 comprises two speakers (one for each ear), each configured for placement in the ear cavity 22. In some embodiments, additional speakers or vibrators may be employed, for example to enhance the frequency response. The eyeglass hearing device 40 comprises electronic components including wireless electronics 66 and wireless antenna 67 for wireless communications with a smartphone and other wireless devices in proximity. In some examples, the wireless antenna 67 may be a chip antenna, for example a ceramic chip antenna. In some embodiments, the wireless antenna 67 may be communicatively coupled to wireless electronics 66 of the eyeglass hearing device 40. The wireless electronics 66 may include functionality to transmit and receive wireless signals. The wireless electronics 66 may utilize standardized protocols, such as Bluetooth, near-field magnetic induction, Wi-Fi, Zigbee or any other known wireless protocol. In some examples, the wireless electronics 66 include low power and low energy functionalities compatible with miniature button cell or coin cell batteries that are commonly used for hearing aids and miniature electronic devices. Bluetooth, including Low Energy (LE) versions, is particularly suited.

In some embodiments, the eyeglass hearing device 40 further comprises one or more biosensors 42 for detecting one or more vital signs such as a heart rate, oxygen saturation level, glucose level, blood pressure, respiration rate and temperature. Other vital signs and activity sensing are well within the scope of the present disclosure utilizing the anatomical advantage of the vascular area along the superficial temporal artery path in front of the ear. The medially oriented receiver portion 48 (interchangeably also called as speaker portion 48) delivers sound directly into the ear cavity 22 while securing the eyeglass hearing device 40 to the head. Secure placement enables reliable long-term vital sign monitoring, even during exercise and vigorous activity. A unique feature of the present invention is the downward extension 43 of the temple portion 41, anterior to the ear 20 and into the ear cavity 22, in contrast with temple placement over and around the ear.

The glass or lens portion 71 may be configured for UV (ultraviolet) protection as in sunglasses, reading, vision correction (prescription), electrochromic (electronic tint control), or transparent with an on-board display 72 (i.e., LCD) for displaying various information, including detected vital signs, text messages, or any information normally displayed on a smartphone display. For example, displaying Internet search results on the eyeglass hearing device display 72. The eyeglass hearing device 40 may be configured for various applications including telephony, fitness, health, safety, or gaming. A text message may be displayed on display 72 or converted to an audible message for delivery by the speaker 49. Text-to-speech and AI generated voice may be incorporated. For an electro-chromatic eyeglass embodiment, the shade level may be electronically adjusted with an-board switch 45, voice command, or via an APP from a smartphone wirelessly connected to the eyeglass hearing device 40.

In a preferred embodiment, the eyeglass hearing device 40 is wirelessly, communicatively coupled to a smartphone for variety of applications including relaying and displaying biosensor data from the biosensor 42 and activity sensor 57, for receiving audio streaming for music listening, and for telephony. In another embodiment, bidirectional wireless audio streaming is provided for hand-free telephony communications via a paired smart phone connected to a cellular network. In other embodiments, telephony communications may be embedded in the eyeglass hearing device 40 connected to a network. The selection for a particular mode of operation or communication may be achieved via on-board switches 45 (i.e., buttons) provided on the temple portion 41, or via wireless commands from a smartphone paired with the eyeglass hearing device 40. The button 45 may be manual for activation by finger, or contactless such as capacitive or optical switch, or by gesture sensing via on-board optical or motion sensor. Sensed biological and physical activity may be transferred to a smartphone, a remote wireless device, or a remote service via the internet.

In some instances, the eyeglass hearing device 40 enhances live sounds picked up by on-board microphones, remote microphones, or audio signals delivered by a wireless device such as smartphone, TV, car radio, music player, etc., via Bluetooth for example. In a preferred embodiment, the user 70 can select the mode of operation, such as directional sound from a particular direction, a wireless audio streaming or a telephone call, among examples that will become obvious to those skilled in the art. This selection can be made from on-board switch 45, a smartphone APP, or by voice activation.

The eyeglass hearing device 40 may be configured to respond to voice commands, and subsequently enable or control other devices including smartphone and electronic appliances in proximity. In some embodiments, the eyeglass hearing device 40 may be configured as a digital assistant when connected to a network. For example, configuring the eyeglass hearing device 40 as an Alexa-enabling device when connected via WiFi or Bluetooth® to a wireless network. In other examples, voice commands may adjust volume, initiate or pick up a phone call.

Motion-related sensors 57 (i.e., accelerometer, gyroscope) maybe be utilized to monitor the position, activity (or inactivity) of the wearer. For example, sleeping, walking, exercise, or for detecting a fall and alerting others about such an adverse event via a wireless network. In an embodiment, the eyeglass hearing device 40 is configured as a telephony device, for receiving and initiating phone calls. In another embodiment, the eyeglass hearing device 40 comprises multiple processors including an audio processor 59, AI processor 58, and a general-purpose processor (MCU) 55. The eyeglass hearing device 40 further comprises power management circuitry 77 and one or more rechargeable batteries 78.

The eyeglass hearing device 40 may be chargeable directly by electrical charge contacts 81 provided on the exterior surface (FIG. 13), a charging port such as micro-USB port 88 (FIG. 6), or via wireless charging via inductive coil 89 embedded in the bridge 44. In one embodiment, a charging case 80 (FIG. 13) may be provided to store the eyeglass hearing device 40 and charge it via case charging contacts 82 during storage. The charging may be wireless with charging inductive coils 83 embedded in the charging case 80. Charge status indicators 90 display battery status information to the user. The charging case may comprise a charging port 86 for charging a rechargeable battery 85 within which provides several charge cycles for the eyeglass hearing device 40. In one embodiment, the charging case 80 comprises telephony hardware 87, a touch screen 89 or keypad for telephony communications. Hands-free telephony communications may be enabled by the combination of the eyeglass hearing device 40 and telephony charging case 80. The charge case 80 may comprise large memory for storing applications, audio, contacts, and video files which may be relayed to the eyeglass hearing device. Voice commands, such as "call office" may be picked up by the voice detection feature of the eyeglass hearing device 40 which triggers a wireless command to the charging case 80 (or a smart phone) and subsequently initiates a call via a network. In other embodiments, the charging case 80 may be configured as a smartphone by incorporating telephony hardware 87, a microphone 88 and a speaker 84.

The disclosed embodiments may combine wireless connectivity, cloud-based services, artificial intelligence (AI) and machine learning (ML) enabling advanced communications, health, and safety monitoring for a person wearing the eyeglass hearing device. Features may include but are not limited to voice detection, voice authentication, speaker isolation, audio recording, language translation, acoustic scene detection for automatic adjustment of hearing enhancement parameters, vital sign monitoring, deep noise cancellation, and stress monitoring, among other features which will become obvious to those skilled in the art. For example, the eyeglass hearing device 40 may be configured, or trained by ML to detect specific faint sounds, such as a crying baby, or detect certain spoken words, convert text messages and other information to audible messages for delivery via the speaker 49, or to visual messages on the eyeglass display 72. The detection mode maybe be always-on or on demand.

The eyeglass hearing device may comprise a camera (not shown) incorporated in the frame of the eyeglass hearing device 40 to view, zoom or record visual scenes depending on the application.

In some embodiments, the eyeglass hearing device 40 may be provided in a singular configuration (monaural), or a binaural configuration for hearing with both ears. In other applications, bone conduction speaker or additional speaker may be provided within the frame to augment the primary speaker 49 configured for placement in the ear cavity 22. In other embodiments, the on-board switch 45 may be used to activate or respond to other wireless devices, an electronic home appliance, or a remote wireless service.

Although examples of the invention have been described herein, it will be recognized by those skilled in the art to which the invention pertains from a consideration of the foregoing description of presently preferred and alternate embodiments and methods of fabrication and use thereof, and that variations and modifications of this exemplary embodiment and method may be made without departing from the true spirit and scope of the invention. Thus, the above-described embodiments of the invention should not be viewed as exhaustive or as limiting the invention to the precise configurations or techniques disclosed. Rather, it is intended that the invention shall be limited only by the appended claims and the rules and principles of applicable law.

What is claimed is:

1. An eyeglass hearing device comprising:
a temple portion extending downward anterior to an ear of a user and curving medially into the ear behind a tragus of the ear, wherein the temple portion is spring loaded to generate inward radial forces with respect to a head of the user for securing the eyeglass hearing device to the head of the user;
a speaker portion connected to the temple portion comprising a speaker, the speaker portion medially oriented for delivering sound into the ear of the user and for securing the eyeglass hearing device to the head of the user;
at least one microphone; and
an audio processor for processing signals sensed by the at least one microphone.

2. The eyeglass hearing device of claim 1, wherein the eyeglass hearing device further comprises wireless electronics for communicating with a wireless device in proximity to the eyeglass hearing device.

3. The eyeglass hearing device of claim 1, wherein the eyeglass hearing device is further configured for any of hearing enhancement, telephony communications, and digital assistance.

4. The eyeglass hearing device of claim 1, wherein the eyeglass hearing device further comprises one or more biosensors in the temple portion positioned adjacent to the superficial temporal artery of the user for detecting one or more vital signs of the user.

5. The eyeglass hearing device of claim 4, wherein the one or more biosensors comprise an optical sensor.

6. The eyeglass hearing device of claim 4, wherein the vital signs are any one or more of heart rate, oxygen saturation level, temperature, respiration rate, glucose level, blood pressure, and a combination thereof.

7. The eyeglass hearing device of claim 1, wherein the eyeglass hearing device further comprises a motion sensor for detecting any of motion, position, and physical activity of the user.

8. The eyeglass hearing device of claim 1, wherein the eyeglass hearing device further comprises any of a vibration sensor, a camera, and a switch.

9. The eyeglass hearing device of claim 1, wherein the eyeglass hearing device is configured to receive any of wireless audio streaming and voice commands.

10. The eyeglass hearing device of claim 1, wherein the eyeglass hearing device further comprises any one or more of an audio processor, a general purpose processor, an AI processor, and a biosensing hub.

11. The eyeglass hearing device of claim 1, wherein the eyeglass hearing device further comprises a lens configured for any of UV protection, reading, electro-chromatic, vision correction, and display.

12. The eyeglass hearing device of claim 1, wherein the speaker portion comprises an ear tip.

13. The eyeglass hearing device of claim 1, wherein the eyeglass hearing device is configured for placement in a charging case for charging thereof.

14. The eyeglass hearing device of claim 13, wherein the charging case is configured as a telephony device.

15. A communication system comprising:
an eyeglass hearing device comprising:
a speaker portion medially oriented for delivering sound into an ear cavity of an ear of a user of the device and for securing the eyeglass hearing device to a head of the user;
a temple portion extending downward anterior to the ear of the user and curving medially into the ear cavity of the user behind a tragus of the ear, wherein the temple portion is connected to the speaker portion and the temple portion is spring loaded to generate inward radial forces with respect to a head of the user for securing the eyeglass hearing device to the head of the user;
at least one microphone;
wireless electronics for communicating with a telephony device in proximity;
an audio processor for processing signals sensed by the at least one microphone; and
a telephony device configured for cellular communications,
wherein the telephony device is further configured for wireless communications with the eyeglass hearing device.

16. The communication system of claim 15, wherein the eyeglass hearing device further comprises at least one biosensor provided for sensing at least one vital signal, wherein the at least one biosensor is positioned in the temple portion in proximity to the superficial temporal artery anterior to the ear of the user.

17. The communication system of claim 15, wherein the eyeglass hearing device is configured for any of hearing enhancement and digital assistance.

18. The communication system of claim 15, wherein the eyeglass hearing device is configured for detecting one or more vital signs including any of heart rate, oxygen saturation level, temperature, respiratory rate, glucose level, and blood pressure.

19. The communication system of claim 15, wherein the eyeglass hearing device further comprises any of a motion sensor, a switch, and vibration sensor.

20. The communication system of claim 15, wherein the eyeglass hearing device is further configured for receiving any of wireless audio streaming and voice commands.

21. The communication system of claim 15, wherein the telephony device is configured as a charging case for the eyeglass hearing device.

22. An eyeglass hearing device comprising:
- a temple portion extending downward anterior to an ear of a user and curving medially into the ear behind a tragus of the ear, wherein the temple portion is spring loaded to generate inward radial forces with respect to a head of the user for securing the eyeglass hearing device to the head of the user;
- a speaker portion connected to the temple portion comprising a speaker, the speaker portion medially oriented for delivering sound into the ear of the user behind the tragus and for securing the eyeglass hearing device to a head of the user; and
- wireless electronics for receiving wireless audio streaming representative of sound delivered by the speaker.

* * * * *